(12) United States Patent
Willem

(10) Patent No.: US 6,176,022 B1
(45) Date of Patent: Jan. 23, 2001

(54) REMOVING MOISTURE FROM HOLLOW GUIDING MEMBERS SUCH AS CABLE DUCTS

(75) Inventor: Griffioen Willem, Ter Aar (NL)

(73) Assignee: Koninklijke PTT Nederland N.V. (NL)

( * ) Notice: Under 35 U.S.C. 154(b), the term of this patent shall be extended for 0 days.

(21) Appl. No.: 09/568,103

(22) Filed: May 10, 2000

Related U.S. Application Data

(62) Division of application No. 08/613,292, filed on Mar. 11, 1996.

(30) Foreign Application Priority Data

Mar. 24, 1995 (NL) .................................................. 9500570
Feb. 15, 1996 (NL) .................................................. 1002363

(51) Int. Cl.[7] .................................................. F26B 7/00
(52) U.S. Cl. .............................. 34/439; 34/487; 34/104; 34/107; 34/232; 174/24
(58) Field of Search .......................... 34/439, 487, 104, 34/105, 107, 210, 218, 232; 174/24, 25 G, 26 G, 28, 211

(56) References Cited

U.S. PATENT DOCUMENTS

| | | | |
|---|---|---|---|
| 3,368,289 | * 2/1968 | Pelsue | 34/232 |
| 3,689,908 | 9/1972 | Ray | 340/239 R |
| 3,886,669 | 6/1975 | Pelsue | 34/107 |
| 3,992,569 | * 11/1976 | Hankins et al. | 174/92 |
| 4,207,685 | * 6/1980 | Pelsue et al. | 34/107 |
| 4,545,133 | 10/1985 | Fryszyn et al. | 34/21 |
| 4,581,478 | 4/1986 | Pugh et al. | 174/24 |

FOREIGN PATENT DOCUMENTS

| | | |
|---|---|---|
| 30 45 388 | 7/1982 | (DE) . |
| 0 186 753 | 7/1986 | (EP) . |
| 57-034504 | 2/1982 | (JP) . |
| 59-068707 | 4/1984 | (JP) . |
| 63-121003 | 5/1988 | (JP) . |
| 3-136115 | 10/1991 | (JP) . |

OTHER PUBLICATIONS

H.S.L. HU et al., "Subducts: The answer to Honolulu's growing pains", *Telephony*, apr. 7, 1980, pp. 32–35.

H. Nassar, "Design and Qualification of Gas Pressurized and Water Blocked Slotted Core Ribbon Cables", *International Wire & Cable Symposium Proceeding*, 1991, 16–23.

* cited by examiner

Primary Examiner—Pamela Wilson
(74) Attorney, Agent, or Firm—Michaelson & Wallace; Peter L. Michaelson.

(57) ABSTRACT

With the object of removing moisture from a system of $N \geq 2$ elongated hollow guiding members (20) for cable-like elements (27), in the system a gas flow (G) is maintained. The gas flow is supplied to the system by way of a gas-supply opening (29) of a coupling-in number (23) coupled to first ends (21) of a number of K hollow guiding members (20) and discharged from the system by way of a gas-discharge opening (30) of a coupling-out member (23) coupled to first ends (21) of the L=N−K remaining hollow guiding members. A coupling-through member (26) coupled to second ends (24) of the N hollow guiding members (20) provides a gastight coupling-through between the second ends (24) of the K hollow guiding members and the L second ends of the L remaining hollow guiding members. Preferably K=N−1, and the N−1 hollow guiding members are located within the Nth hollow guiding member.

12 Claims, 4 Drawing Sheets

REMOVING MOISTURE FROM HOLLOW GUIDING MEMBERS SUCH AS CABLE DUCTS

This application is a division of Ser. No. 08/613,292 filed Mar. 11, 1996.

BACKGROUND OF THE INVENTION

1. Field of the Invention

The invention lies in the field of systems of hollow guiding members for cable-like elements, such as cable ducts. In particular, it concerns a method for removing and/or detecting moisture penetrating into a hollow guiding member of a system of hollow guiding members. It further concerns a system of hollow guiding members for cable-like elements for applying the method according to the invention. Finally, it concerns coupling members for application in a system of hollow guiding members according to the invention.

2. Prior Art

It is customary not to bury cables, particularly glass-fibre cables, directly in the ground, but first to lay a tubular protection, hereinafter referred to as cable duct or duct for short, in the ground and subsequently to install the glass-fibre cable in this laid duct. Such cable duct has two major functions, namely, as guiding member for guiding a cable during installation in the desired direction, and a protection member for protecting a cable once installed in the duct against damaging outside influences. Digging trenches or ditches in the ground to subsequently lay a cable duct therein, however, is an expensive affair. Preferably, therefore, cable ducts are applied which, once buried, continue to meet future needs of new, additional or substitute cables for as long as possible. These may be cable ducts consisting of a singular tube, from which a cable once installed therein can be simply removed and replaced by a new cable. Furthermore, a cable duct with a relatively large diameter, such as, e.g., is disclosed in reference [1], may contain several cable ducts with smaller diameters, referred to as sub-ducts. In this connection, there is introduced into a large, primary tubular duct already buried a bundle of smaller, secondary tubular ducts, referred to as sub-ducts. Subsequently, at any desired point in time cables may be installed in the sub-ducts as the need arises. Here, such sub-ducts not only offer an additional protection to the cables, but also simplify the routing of the cables. Moreover, such sub-ducts make it possible to selectively remove cables and to replace them by new ones. This technique is not only applicable to complete cables, either electric cables or optical-fibre cables, provided with a traction element and various protective sheaths against outside influences. As is disclosed in reference [2], this technique is applicable down to core level, with the cable to be introduced into a sub-duct comprising only one or a few cores, such as copper wires or glass fibres. Reference [3] discloses a technique which, inter alia, applies a bundle of sub-ducts consisting, as it were, of a cable-sheath body provided with several tubular cavities wherein fibre elements may be installed as the need arises with the help of a blast-air technique.

A singular cable duct, but definitely a combination of a primary and a secondary duct, for each cable installed therein in fact forms a (double) wall around the cable, which may offer a (double) protection against negative outside influences, such as against penetrating moisture. Therefore, cables to be installed might be of a simpler construction if the (double) wall around the cable meets certain conditions. Thus, a cable need not be provided with a (metal) moisture screen if no moisture from outside the primary duct is able to penetrate into a secondary duct, as a result of which the cable may be implemented more lightly and cheaply, and may be smaller in size.

The current frequently used cable ducts, wherein complete optical-fibre cables are installed, often are tubes made of synthetic material, such as HDPE. Due to diffusion, however, such synthetic materials are permeable for water. This means that, even if in such a tube there is no leak, water may still gradually accumulate within such tube, which may subsequently affect a cable not protected against it. From manufacturing and cost considerations it would be a great advantage to be able to use such synthetic tubes, apart from the inner and outer diameters, without modification, both for the primary and for the secondary duct, particularly also for a cable without moisture screen.

In addition it is disclosed, such as, e.g., in references [4] and [5], particularly in the event of optical-fibre cables, to pressurize hollow spaces between the optical fibres lying within the sheath of the cable over a length of the cable with compressed gas in order to prevent moisture penetration through the cable sheath. This functions well in the event of leaks of not-too-great dimensions. Moisture penetrating due to diffusion, however, cannot be stopped in this manner, since for diffusion the driving force does not lie in the total pressure prevailing in the hollow spaces, but rather in the partial pressure of the water vapour present therein.

A variant of this technique is still disclosed in reference [6], in which an A1 tubelet, provided with a glass fibre, of a composite overhead glass-fibre cable, through an open end in a gas-tight interconnection box, is first blown through with compressed gas (dry nitrogen). Subsequently, the other end is closed off gas-tight. The nitrogen gas is retained under pressure in the interconnection box and in the tubelet, as a result of which the formation of frozen water drops in the event of a decline in ambient temperature is prevented. Furthermore there is disclosed, as in reference [7], the forcing of dry nitrogen gas under high pressure through the free space between the electric cores within the sheath of an underground cable from one cable end to the other. As a result, the cable innards are kept dry to prevent the formation of electrochemical trees in the synthetic insulation of the cable sheath.

SUMMARY OF THE INVENTION

An object of the invention is to provide the technique referred to above, with which a system of elongated hollow guiding members, wherein cable-like elements may be, or are, included without special protective sheath against moisture, is still protected against penetrating moisture. In this connection, it makes use of the fact that the moisture content in a space enclosed by walls, wherein moisture may penetrate due to diffusion, may be controlled by conveying through this space a flow of air, or more generally, of a gas with a relatively low humidity, and thereby draining off an excess of moisture. By maintaining such a flow, the humidity in the space may be kept relatively low, namely, below saturation of the moisture in the gas present in the space, so that no drops, let alone pools of water, are capable of being formed.

Basically, this method of removing, and keeping removed, moisture, may be applied to a single elongated hollow guiding member, such as a single cable duct. There is the drawback, however, that in most applications of a cable duct, the two duct ends, which are provided with an opening through which the hollow innards of such single hollow guiding member are accessible, are generally spaced far apart. Therefore, at two places lying far apart special measures are required, both to introduce the gas flow by way of a first opening and to collect the gas flowing out of the second opening. Collection of gas flowing out is primarily required if the guiding member with its second opening opens out into a building or residence, and most definitely in the event that a special gas is to be applied which is no ordinary component of the ambient air. In addition, there is a government safety guideline, which prohibits the opening out of tubes into buildings. In the event, however, that there still is a second hollow guiding member present—and such is always the case, e.g., in the event of application of the sub-ducts technique outlined above—said second hollow guiding member may function as return channel for gas flowing from the first guiding member, while at the same time said second hollow guiding member may be kept dry. The invention therefore provides for a method for removing moisture from a system of elongated hollow guiding members for cable-like elements, which system comprises a number of $N \geq 2$ hollow guiding members, each provided with a first opening and a second opening, in which method gas flows are maintained in the hollow guiding members of the system, with a gas flow being supplied to the system by way of the first openings of a number of K hollow guiding members ($1 \leq K \leq N-1$), which gas flow is discharged from the system by way of the first openings of a number of L remaining hollow guiding members ($1 \leq L \leq N-K$), with gas flowing out by way of second openings of the K hollow guiding members being supplied to the L remaining hollow guiding members by way of second openings of the L remaining hollow guiding members.

Further the invention provides for a system of elongated hollow guiding members for cable-like elements, which system comprises a number of $N \geq 2$ hollow guiding members, each provided with a first opening and a second opening, wherein the system further comprises:

a coupling-in member for supplying a gas flow to a number of K hollow guiding members ($1 \leq K \leq N-1$) by way of the first openings thereof, which coupling-in member is coupled gastight to the first openings of said number of K hollow guiding members ($1 \leq K \leq N-1$), which coupling-in member is further provided with a gas-supply opening and with gastight feed-through openings for cable-like elements included in one or more of the K hollow guiding members, a coupling-out member for discharging gas flowing out by way of first openings of a number of L remaining hollow guiding members ($1 \leq L \leq N-K$), which coupling-out member is coupled gastight to the first openings of said number of L of remaining hollow guiding members, which coupling-out member is further provided with a gas-discharge opening, and with gastight feed-through openings for cable-like elements included in one or more of the L hollow guiding members, and one or more coupling-through members for gastight coupling-through the second openings of the K hollow guiding members and the second openings of the L hollow guiding members, with each coupling-through member being provided with gastight couplings-through between second openings of at least one of the K hollow guiding members and of at least one of the L hollow guiding members, and with gastight feed-through openings for cable-like elements included in one or more of the hollow guiding members, for which a respective coupling-through member provides for the gastight coupling-through.

Preferably, the gas is conveyed in a return direction by way of one hollow guiding member. In the event that the one hollow guiding member comprises the remaining hollow guiding members, the gas is then conveyed over outer walls of the remaining hollow guiding members, which are thereby simultaneously also protected on the outside against penetrating moisture. In a preferred embodiment, the gas flowing out is conveyed over moisture-detection means, with which any leaks sprung are capable of being spotted in time.

Finally, the invention provides for special coupling members for application in systems of elongated hollow guiding members for cable-like elements according to the invention.

REFERENCES

[1] H. S. L. Hu and R. T. Miyahara, "Sub-ducts: The answer to Honolulu's growing pains", Telephony, Apr. 7, 1980, pp. 32–34 and 133;
[2] DE-A-3045388;
[3] EP-A-0186753;
[4] JP-A-57034504 (publ. dat. 820224);
[5] H. Nassar and U. Oestreich, "Design and qualification of gas pressurized and water blocked slotted core ribbon cables", Intern. Wire & Cable Symp. Proc. 1991, pp. 16–23;
[6] JP-A-63121003 (publ. date 880525);
[7] U.S. Pat. No. 4,545,133.

All references are considered to be incorporated in the present application.

BRIEF DESCRIPTION OF THE DRAWING

The invention will be further explained by means of a description of exemplary embodiments, with reference being made to a drawing comprising the following figures.

DESCRIPTION OF EXEMPLARY EMBODIMENTS

In the framework of the invention, a cable duct, or duct for short, is understood to mean an elongated hollow guiding member comprising a channel-shaped hollow space, which hollow space is enclosed in longitudinal direction by a tube-shaped wall, and in which hollow space there is, or may be, included a cable-like element in longitudinal direction. In this connection, the tube-shaped wall of such elongated guiding member forms a protective wall for a cable-like element included therein against damaging ambient influences from outside the cable duct. A cable-like element, or cable for short, is understood to mean any cable or wire comprising at least one electric core or optical fibre. Basically, the cable duct may have any transverse section, such as round, square, trapezium-shaped, triangular, a closed U-shape etc. The only requirement is that the minimum inner diameter of the cable duct is always sufficiently larger than the maximum outer diameter of a cable which is, or has been, included in the duct, in order to be able to convey a gas flow through the duct over the outer wall of the included cable. In the exemplary embodiments described below, however, for simplicity's sake there is assumed the round transverse section most frequently used in practice. Furthermore, a duct with a smaller transverse section in its turn may be included in the hollow space of a duct with a greater transverse section. One of the exemplary embodiments applies this method.

The invention may be applied in ducts and duct systems for cables in varying surroundings, such as for cables buried in the ground, whether below ground-water level or not, and in water crossings, for hanging cables and for cables in buildings.

Figure 1:
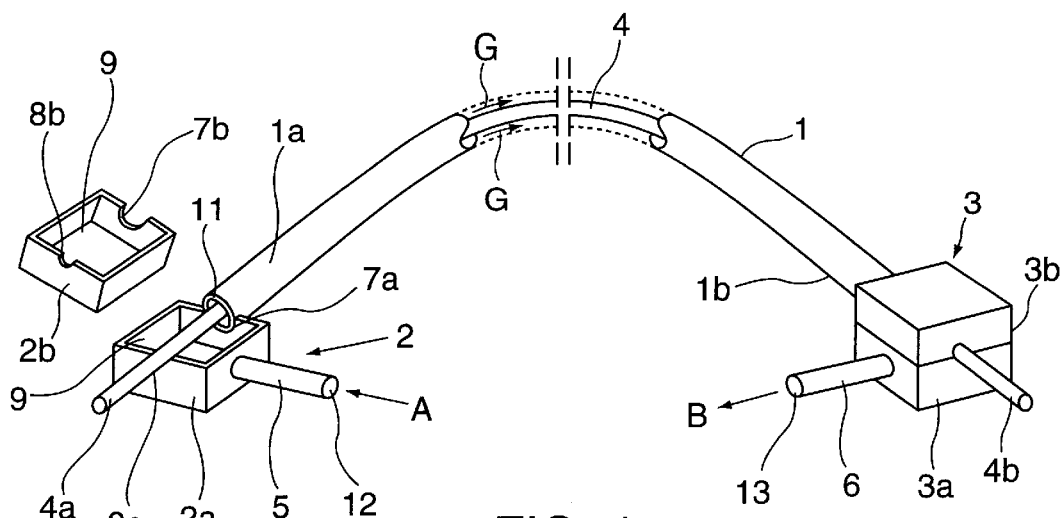
FIG. 1 schematically shows the principle of removing moisture, on which the invention is based.

The principle of removing moisture, on which the invention is based, is schematically shown, in its most elementary form, in FIG. 1. A duct 1 is closed off, at a first duct end 1a with a first opening 11, by a first coupling member 2, and is closed off, at a second end 1b with a second opening (not shown), by a second coupling member 3. In the duct 1, there is included a cable 4 whose ends 4a and 4b protrude through the coupling members 2 and 3, respectively. The coupling members 2 and 3 are provided with connection pipes 5 and 6, respectively, for connecting gas-supply or gas-discharge means (not shown). The coupling members 2 and 3 are implemented identically, with the coupling member 2 being shown opened in the Figure, and the coupling member 3 closed. Each of the coupling members is implemented box-shaped and consists of two parts, a bottom part 2a or 3a, respectively, and a top part 2b or 3b, respectively. The bottom part 2a and the top part 2b of the coupling member 2 are provided with corresponding first recesses 7a and 7b for the close-fitting and gastight receiving of the first duct end 1a, and with corresponding second recesses 8a and 8b for the close-fitting and gastight receiving of the cable end 4a, when the top part 2b is fastened to the bottom part 2a in a closed state of the coupling member 2. In closed state, the bottom part 2a and the top part 2b enclose a hollow space 9, hereinafter referred to as chamber, which through the first opening 11 is in open connection with the hollow space of the duct 1, and through which the cable end 4a protrudes from the duct end 1a. The connection pipe 5 runs through a wall of the coupling member 2 and opens out into the chamber 9. Apart from the connection pipes 5 and 6, which in the Figure are mounted in the bottom parts 2a and 3a, respectively, the bottom parts and the top parts may be implemented identically.

In order from the duct to remove moisture penetrating and penetrated therein, in the duct 1 there is maintained over the cable 4 included therein a continuous gas flow which may carry along the moisture to an exit of the duct. By maintaining a pressure differential between an entry opening 12 of the connecting pipe 5 and an exit opening 13 of the connecting pipe 6, a gas flow (arrows G) originates and is maintained through the duct 1 over the cable 4. For this purpose, e.g., there is connected to the connection pipe 5 a gas-delivery pump (not shown) which, under a constant pressure in excess of the ambient pressure, pumps a gas with a relatively low moisture content through the connecting pipe 5, by way of the chamber 9 of the coupling member 2 (in closed state) and by way of the first opening 11 of the duct end 1a into the duct 1 (arrow A). The gas subsequently flows through the duct 1 over the cable 4 from the duct end 1a to the duct end 1b, and by way of the coupling member 3 through the connection pipe 6 outwards. For the gas flow, dry or dried ambient air is preferably used, which is able to carry a relatively large amount of moisture. Thus, a cable duct wherein moisture diffuses or even seeps through a wall of the cable duct, may be kept sufficiently dry. The gas flow flowing outwards through the exit opening 13 of the connection pipe 6 (arrow B) may be collected and conveyed past moisture-recording equipment (not shown), whereby the moisture content of the gas in the course of time is recorded and monitored. Thus, in the event of a sudden rise in moisture content, which may indicate the development of leaks in the duct, investigative actions may be undertaken forthwith.

Figure 2:
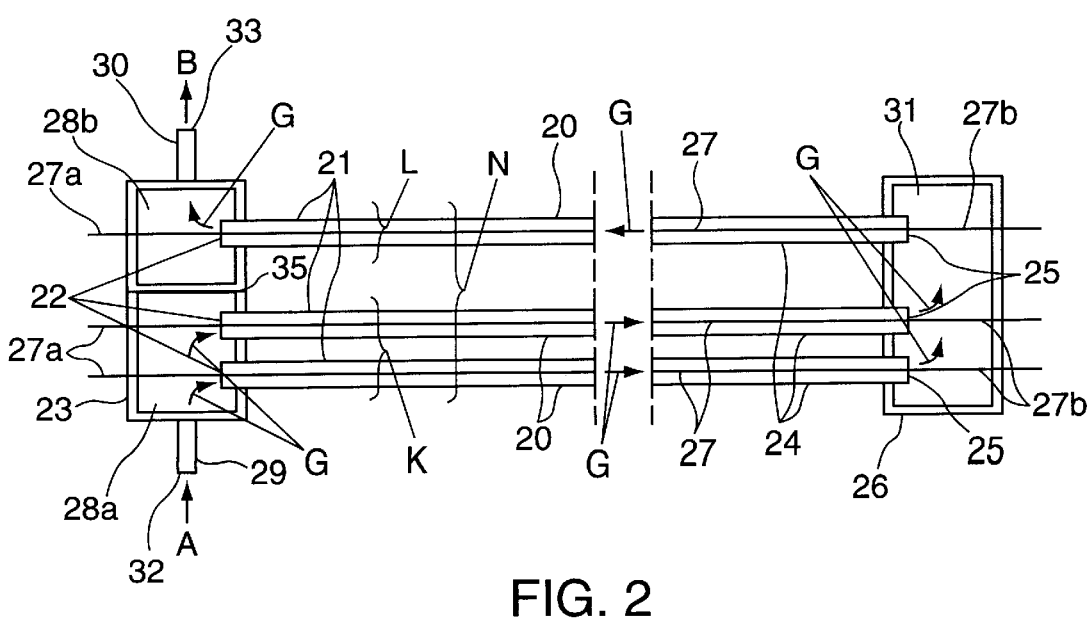
FIG. 2 schematically shows a first exemplary embodiment of the invention.

A restriction of this principle of removing moisture in its most elementary form is that, in most applications of cable ducts, the two duct ends of a cable duct are spaced far apart, and that the pressure pump and the recording equipment would therefore have to be situated at a great distance from one another. This restriction may be eliminated if there are at least two cable ducts available of which the respective duct ends lie in each other's vicinity. In this case, the coupling members by which two duct ends lying in each other's vicinity are closed off, may be coupled through, e.g., by way of their connection pipes or by way of a common coupling-through member, so that a gas flow which is conveyed forward through one duct is conveyed backward through the other duct. An exemplary embodiment wherein such return option for the gas flow is available, is schematically shown in FIG. 2 for a system of N cable ducts 20, whose first duct ends 21 with first openings 22 are closed off by a common coupling member 23, referred to as coupling member 23 for short, and second duct ends 24 with second openings 25 are closed off by a common coupling-through member 26, referred to as coupling-through member 26 for short. In each of the N cable ducts, there may be included a cable 27. The coupling member 23 comprises two chambers, a first chamber 28a and a second chamber 28b. As indicated by line 35, these two chambers are separate from one another, though, as shown, formed in common coupling member 23. In the first chamber 28a, there open out the first duct ends 21 of K (K≥1; in the drawn example, K=2 was chosen) ducts of the N ducts, while the first duct ends of the remaining L (=N−K; L≥1; in the drawn example, L =1 was chosen) ducts open out into the second chamber 28b. The first ends 27a of the cables 27 included in the K ducts and in the L ducts are led through the first chamber 28a and the second chamber 28b, respectively, to outside the coupling member 23. The coupling member 23 is further provided with a first connection pipe 29, which opens out into the first chamber 28a, and with a second connection pipe 30, which opens out into the second chamber 28b. The coupling-through member 26 comprises a chamber 31, into which the second duct ends 24 of the N ducts open out, and through which second ends 27b of the cables 27 are led to outside the coupling-through member 26. The coupling member 23 and the coupling-through member 26 may be of a similar box-shaped construction as the coupling members 2 and 3 shown in FIG. 1, therefore consisting of a bottom part and a top part provided with corresponding recesses for the close-fitting and gastight receiving of the respective duct and cable ends.

In the system of N ducts shown in FIG. 2, a continuous gas flow is maintained by maintaining a pressure differential between the first chamber 28a and the second chamber 28b of the coupling member 23. This may be effected by connecting, to the connection pipe 29, a gas-delivery pump (not shown) which pumps a gas through the entry opening 32 (following arrow A) by way of The connection pipe 29 into the first chamber 28a of the coupling member 23. A gas flow then begins to flow (following arrows G), which is distributed over the K ducts, through said ducts over the cables 27 possibly included therein, in the direction of the coupling-through member 26, by way of the second openings of the cable ends 24 of the K ducts, subsequently through the chamber 31 of the coupling-through member 26, by way of the second openings 25 of the duct ends 24 of the L ducts 27, through the L ducts in the direction of the coupling member 23, by way of the first openings 22 of the first duct ends 21 of the L ducts, through the second chamber 28b of the coupling member 23 and through the connecting pipe 30 outwards via an exit opening 33.

In the duct system shown in FIG. 2, in each duct there is included a cable 27. This is not necessary. In practice, in most cases one or more spare ducts will be available, wherein cables are included only in the event of a need felt in the future. As long as not all ducts have been filled with a cable yet, the return conveyance of the gas flow is preferably effected by way of such still empty spare ducts.

Figure 3:
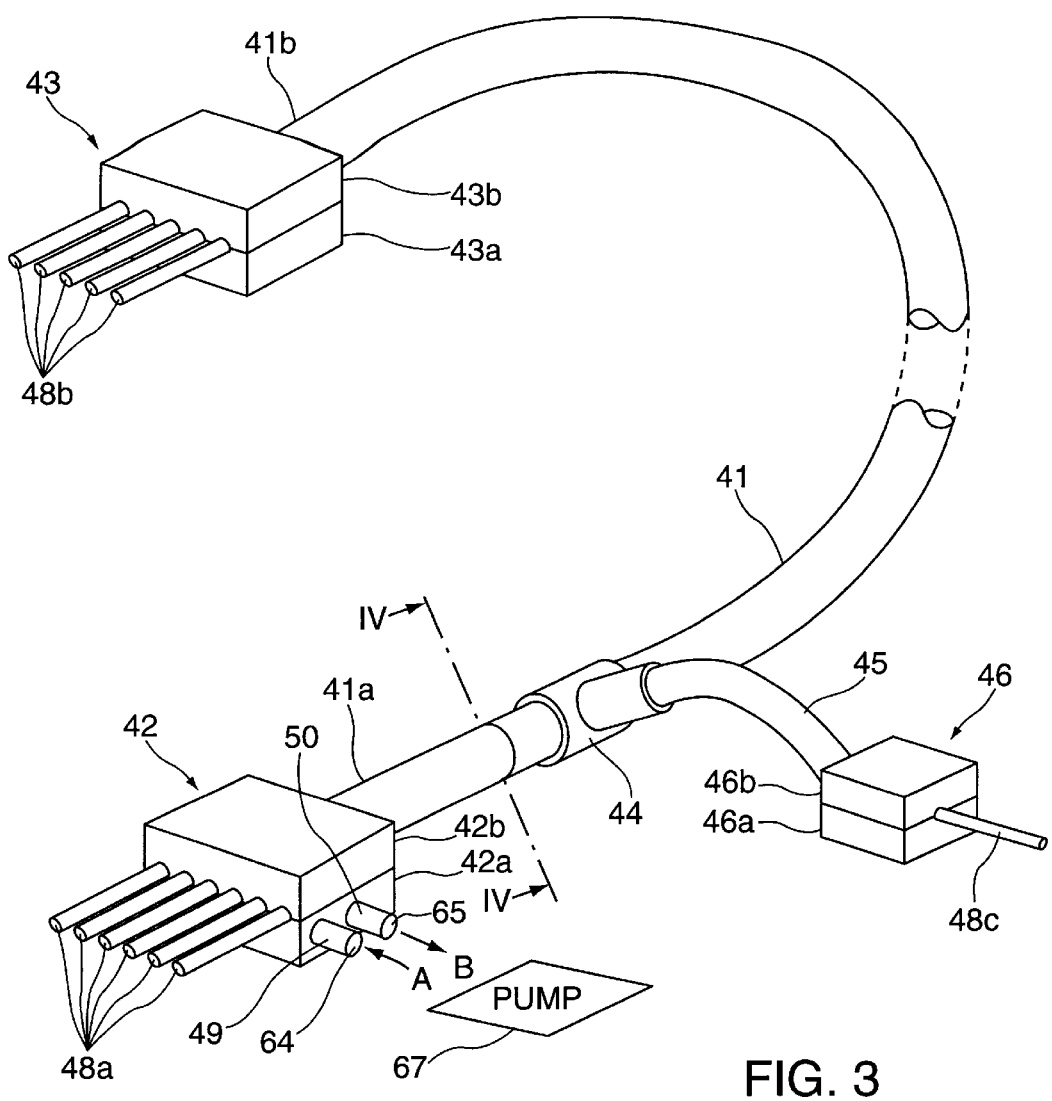
FIG. 3 shows a second exemplary embodiment of the invention.
Figure 4:
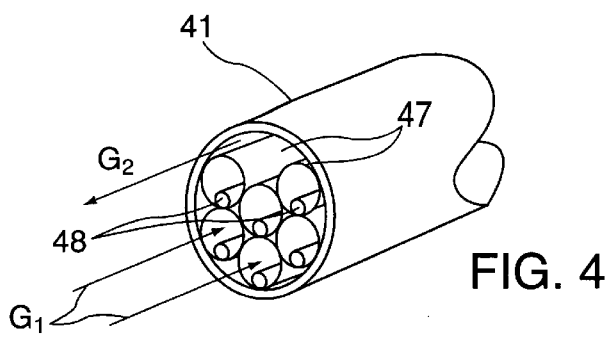
FIG. 4 shows a transverse section of a duct applied in the exemplary embodiment shown in FIG. 3.
Figure 5:
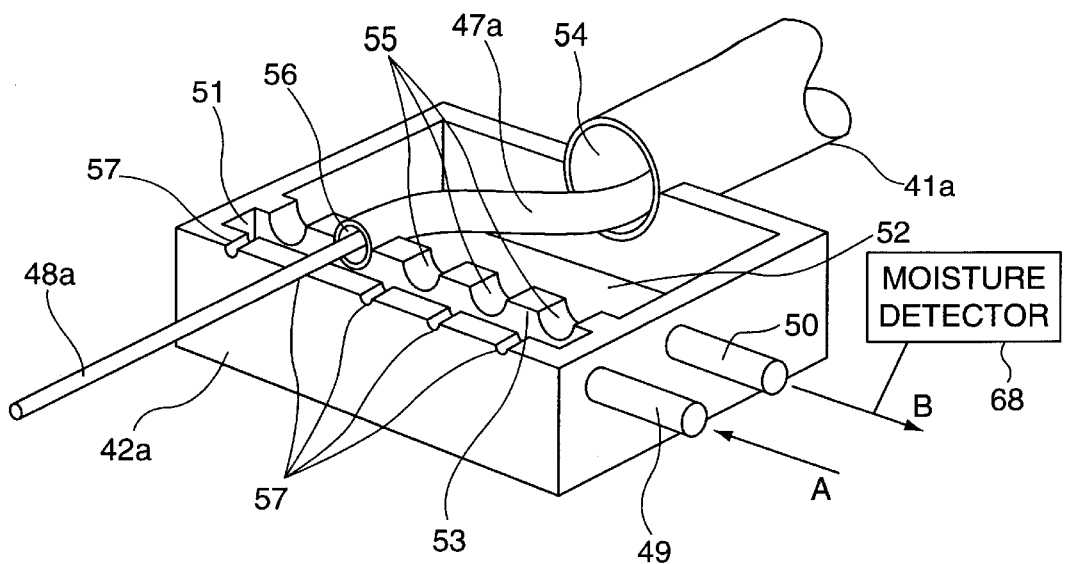
FIG. 5 shows part of a coupling member connected to a duct end, applied in the exemplary embodiment shown in FIG. 3.
Figure 6:
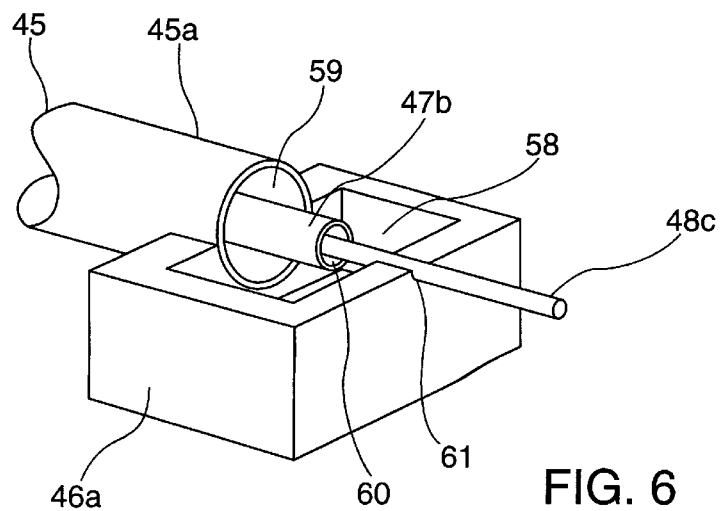
FIG. 6 shows a part of a coupling-through member connected to a duct end, applied in the exemplary embodiment shown in FIG. 3.
Figure 7:
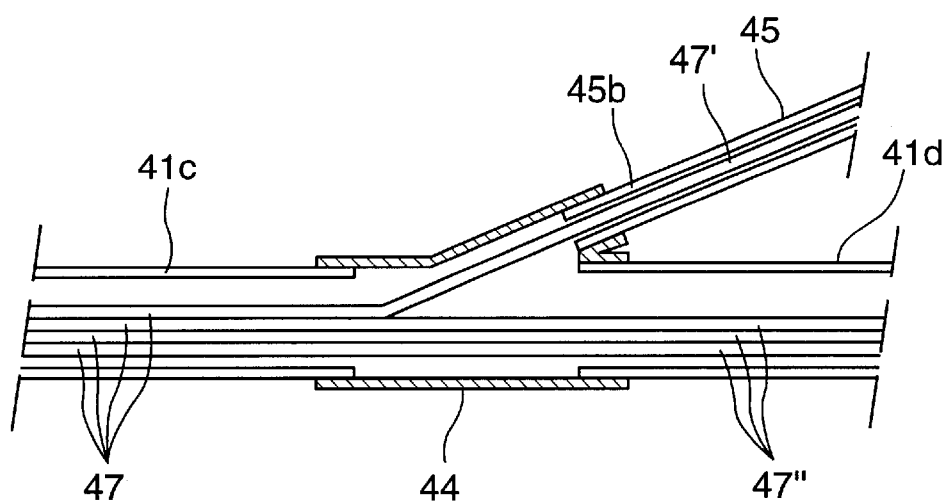
FIG. 7 shows a longitudinal section of a duct branching applied in the exemplary embodiment shown in FIG. 3.

A return option for the gas flow is always available if a cable duct with a relatively large diameter is applied, wherein a number of cable ducts with smaller diameters, referred to as sub-ducts, is included. This option is shown in a second exemplary embodiment, which is described with reference to the Figures FIG. 3 up to and including FIG. 7. Of these Figures, FIG. 3 shows a duct system comprising a duct 41, of which a first duct end 41a is closed off by a coupling member 42, and of which a second duct end 41b is closed off by a coupling-through member 43. The coupling member 42 is box-shaped and consists of a bottom part 42a and a top part 42b. The coupling-through member 43 is also box-shaped, with a bottom part 43a and a top part 43b. In the duct 41, between the duct ends 41a and 41b, there is included a Y-coupling 44. By way of the Y-coupling 44, a duct 45 branches off from the duct 41. The duct 45 is closed off by a coupling-through member 46. The coupling-through member 46, too, is implemented in the shape of a box, consisting of a bottom part 46a and a top part 46b. As a section along the line IV–IV shown in FIG. 4 illustrates, there are included in the duct 41 a number of sub-ducts 47. In the Figure, six are shown by way of example. One of the sub-ducts 47 deflects from the duct 41 by way of the Y-coupling 44, and continues in the duct 45 (see FIG. 6 and FIG. 7 below). Each sub-duct 47 contains a cable 48. The bottom part 42a of the coupling member 42 is provided with a first connection pipe 49 and a second connection pipe 50. In this second exemplary embodiment, the coupling member 42 and the coupling-through members 43 and 46 are of a similar box-shaped construction as the coupling(-through) members of the exemplary embodiments shown in FIG. 1 and FIG. 2, therefore again consisting of a bottom part and a top part, also provided with corresponding recesses for the close-fitting and gastight receiving of duct and cable ends. FIG. 5 shows the bottom part 42a of the coupling member 42 connected to the duct end 41a of the duct 41. The bottom part 42a contains a first chamber 51 and a second chamber 52, separated from one another by a partition 53. The duct end 41a opens out into the second chamber 52, so that this chamber, by way of a first opening 54 of the duct end 41a, is in open connection with the hollow space of the duct 41. The first connection pipe 49 opens out into the first chamber 51, and the second connection pipe 50 opens out into the second chamber 52. A sub-duct end 47a of each sub-duct 47 included in the duct 41 runs through the second chamber 52 and opens out into the first chamber 51. The partition 53 is therefore for each sub-duct end 47a provided with a recess 55 for the close-fitting and gastight receiving of such sub-duct end. By way of an opening 56 of each sub-duct end 47a, the first chamber 51 is in open connection with the hollow space of each sub-duct 47. A cable end 48a of a cable 48 included in each sub-duct 47 runs through the first chamber 51 and protrudes, by way of a recess 57 for the close-fitting and gaslight receiving of the cable end 48a, to outside the bottom part 42a of the coupling member 42. In FIG. 5, by way of example only one sub-duct end 47a and six recesses 55 for sub-duct ends 47a and six recesses 57 for cable ends 48a are shown. FIG. 6 shows the bottom part 46a of the coupling-through member 46 connected to the duct 45, which forms a branch of the duct 41. The coupling-through member 46 is provided with a chamber 58, wherein a duct end 45a of duct 45, and a sub-duct end 47b of the sub-duct 47 included in duct 45, open out. The duct end 45a of duct 45 has an opening 59, and the sub-duct end 47b has an opening 60, so that the hollow space of sub-duct 47, by way of the opening 59, the chamber 58 and the opening 60, is in open connection with the hollow space of the duct 45. A cable end 48c of a cable 48, which is included in the sub-duct 47, which in turn is included in the duct 45, runs through the chamber 58 and protrudes, by way of a recess 61 for the close-fitting and gastight receiving of the cable end 48c, to outside the bottom part 46a. The coupling-through member 43 may be implemented in a similar manner as coupling-through member 46, albeit that the coupling-through member is then provided with a number (six in the drawn example) of recesses 61 for the close-fitting and gastight receiving of as many cable ends 48b as there open out sub-ducts 47 with their ends 47b into the chamber 58. Furthermore, the coupling-through member 43 may be implemented in a similar way as the coupling member 42, with the two chambers 51 and 52 being in open connection with one another. Such an open connection between the two chambers may be implemented either by directly connecting-through the connection pipes 49 and 50 or by leaving out the connection pipes 49 and 50 and providing the partition 53 with an additional opening, or leaving it out altogether. FIG. 7 shows, in longitudinal section, the Y-coupling 44 which couples a first duct part 41c of the duct 41 gastight to a second duct part 41d of the duct 41 and to a second end 45b of the duct 45. The Y-coupling furthermore is such that the hollow space of the duct ends 41c and 41d, and of the duct 45, are in open connection with one another. From a bundle of sub-ducts 47, which are included in the duct part 41c, a sub-duct 47' deflects in the direction of, and continues through, the duct 45 in the direction of the coupling-through member 46, while the remaining sub-ducts 47" of the bundle continue further in the second duct part 41d of the duct 41. Any cables 48 included in the sub-ducts are not shown in this Figure.

In the duct system shown in FIG. 3 up to and including FIG. 7, a continuous gas flow is maintained by maintaining a pressure differential between the first chamber 51 and the second chamber 52 of the coupling member 42. This may be effected by connecting, to the connection pipe 49, a gas-delivery pump 67, which pumps a gas (following arrow A), through an entry opening 64, by way of the connection pipe 49 into the first chamber 51 of the coupling member 42. A gas flow then begins to flow, which is distributed among the (six) sub-ducts 47 which open out into the first chamber 51, through these sub-ducts 47 (see arrows G1 in FIG. 4) over the cables 48 possibly included therein, in the direction of the coupling-through members 43 and 46, from the respective sub-duct ends 47b into the chambers of the respective coupling-through members, by way of the chambers back into the duct ends (41b and 45a), through the ducts 41 and 45 (now outside over the sub-ducts; see arrow G2 in FIG. 4), back in the direction of the coupling member 42, and by way of the second chamber 52 and the connection pipe 50 (following arrow B) outwards via an exit opening 65 to a moisture detector 68.

Figure 8:
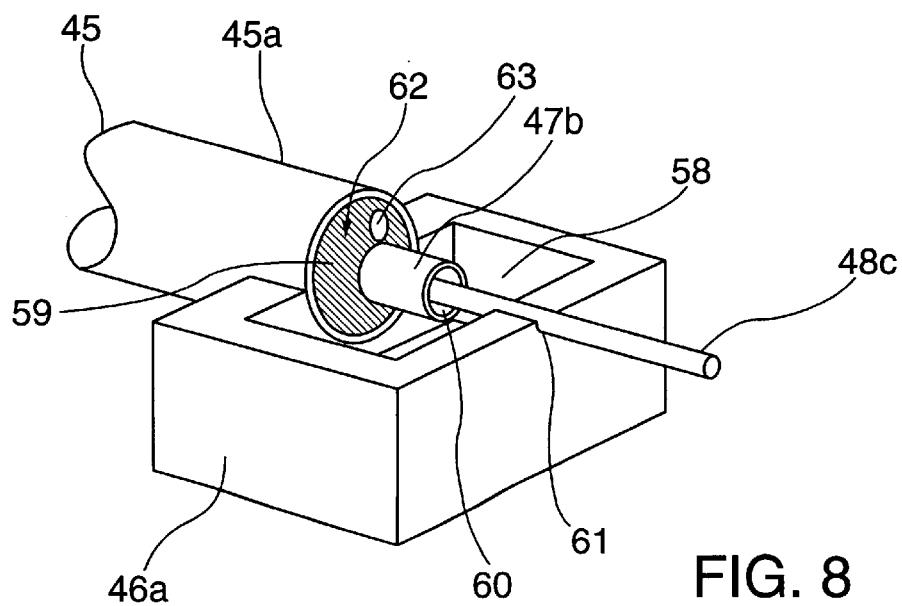
FIG. 8 shows a variant of the view shown in FIG. 6.

The duct system shown in FIG. 3 is a duct system with a branching by way of a Y-coupling. Of course, the application of the invention is not limited thereto. The duct system may comprise various forms of such branchings, e.g., consecutively for each of the sub-ducts 47 included in the duct 41. Also, more than one sub-duct 47 may continue in the branching-off duct 45. Furthermore, a branching-off duct such as 45 may also branch by way of a Y-coupling. Depending on the application, the various branches of such branching duct system may considerably vary in dimension (i.e., lengths and diameters), and therefore their flow resistances as well. In order to obtain a balanced distribution of the gas flow among the various branches of the duct system, it may be necessary to dimension such flow resistances differently. Such dimensioning is preferably effected for the return flow in each coupling-through member, such as the coupling-through members 43 and 46. FIG. 8 shows the coupling-through member 46 of FIG. 6, with the opening 59 of the duct end 45a of the duct 45 around the sub-duct end 47b being sealed by a sealing plug 62 made of, e.g., rubber, which is provided with a well-dimensioned through-flow opening 63. The through-flow opening 63 is preferably located above the sub-duct end 47b, so that any water which, as a result of a leak in the duct 45 or the duct 41, has accumulated in the hollow space of the duct 45, cannot flow directly into the chamber of the coupling-through member, and by way of the chamber into a sub-duct included in the duct. But even if the water level comes to exceed that of the through-flow opening 63, even then, in the event of suitable dimensioning of the through-flow opening, the gas flowing through may still have such a flow rate that the counterflow of the water is prevented.

Such sealing plugs, provided with a well-dimensioned through-flow opening, may also be applied in the second openings 25 of the remaining L ducts, which open out into the chamber 31 of the coupling-through member 26 in The duct system shown in FIG. 2.

In the exemplary embodiments described above, coupling (-through) members are applied, which are box-shaped with two parts which are placed around duct ends and cable ends protruding therefrom. Basically, it is also possible to apply one-piece (screw-on) coupling members, through which cable ends are led. Such one-piece form for a coupling member is preferred at duct ends from which only one cable end protrudes, and then not too far.

Below, there follow several considerations which may constitute a basis for the determination of the size of the necessary airflow required to keep a given duct system, wherein moisture penetrates due to diffusion, sufficiently dry. Two examples will be numerically presented. The first example corresponds to the exemplary embodiment of FIG. 1, and the second one to the exemplary embodiment of FIG. 3. In this connection, there will be assumed a worst-case situation at 20° C. Generally speaking, the ambient temperature will be lower, as is the case for a duct system buried in the ground, and less moisture will diffuse inwards. The case wherein real leaks occur and the inflow may be greater, will not be considered. In the examples, it is assumed that the required airflow inside the ducts must maintain a relative humidity (RH) below 70%, with the airflow fed to the duct system having an initial RH of 50%. An RH of 50% for the supplied airflow means that in the cold season the air for the airflow can be obtained directly from the surroundings, while in the hot season it may be necessary that, in the event of application of ambient air, must be dried first.

Currently, often-used cable ducts are High-Density Polyethylene (HDPE) tubes. A usual requirement for the penetration constant $P_{H2O}$ for water, also referred to as water permeation constant, is $P_{H2O} < 10^{-4}$ gm$^{-1}$h.$^{-1}$bar$^{-1}$. For the (water) mass flow $J_{H2O}$ which per time unit (per hour) diffuses through the wall of a cylindrical HDPE tube of length L, and with an inner diameter $D_i$ and an outer diameter $D_o$. (hereinafter also referred to as a $\Phi$ $D_o/D_i$ mm tube of length L for short), it follows that:

$$J_{H2O} = 2\pi L \{\ln(D_o/D_i)\}^{-1} P_{H2O} \Delta P_V \qquad (1)$$

where $\Delta P_V$ represents the pressure differential between the water-vapour pressures outside and inside the cylindrical tube. For a 50% differential in RH between the surroundings of the tube and the inside of the tube (outside in water, i.e., 100%, and inside 50%, with which the air is fed), from (1) there follows a mass flow for the moisture penetrating the tube of less than 0.035 g/h. per km for a $\Phi$ 32/26 mm tube, and of less than 0.025 g/h. per. km for $\Phi$ 16/12 mm and $\Phi$ 8/6 mm tubes.

An airflow through such tube is laminar, so that in the event of an air-pressure gradient dp/dx in the longitudinal direction over the tube, the volume flow $\Phi_V$ of the air may be expressed by:

$$\Phi_V = \pi D_i^4 (128\mu)^{-1} dp/dx \qquad (2)$$

where $\mu$ is the dynamic viscosity of air, which has a value of $\mu = 1.8 \times 10^{-5}$ Pas.

Example 1

If duct 1 in FIG. 1 is a $\Phi$ 36/26 mm tube of length L=30 km, 1.05 g of water per hour will permeate inwards. One litre of air 100% saturated with water at 20° C. contains 0.023 l. of water vapour. One mole of water vapour weighs 18 g and takes up 22.4 l. of volume at 20° C. One litre of 100% saturated air therefore contains 0.0185 g of water. By way of connection pipe 5, 50% saturated air is supplied, while the RH of the airflow flowing out of the connection pipe must not exceed 70%. In this manner, per litre of air a maximum of 0.0037 g of water is absorbed. To keep the relative humidity in the tube below 70%, therefore, an airflow of 284 l./h. is required, which corresponds to 7.9× $10^{-5}$ m$^3$/s. Such airflow may be maintained by a pressure differential of only 0.04 bar, which is feasible with a very simple compressor.

Example 2

In the duct system of FIG. 3, the duct 41 is a $\Phi$ 32/26 mm tube of length $L_1$=40 m. The branching duct 45 is a $\Phi$ 16/12 mm tube, starts at 5 m from the coupling member 42 and has a length $L_2$=5 m. The six sub-ducts 47 in the duct 41, one of which deflects into the branching duct 45 towards the coupling-through member 46, are $\Phi$ 8/6 mm tubelets. The airflow is simultaneously fed, in the coupling member 42 in the first chamber 51 (see FIG. 5), to the openings 56 of the sub-duct ends 47a. The return flow of the air (arrow G2 in FIG. 4) runs from the coupling-through members 43 and 46, through the ducts 41 and 45, along the outer walls of the sub-ducts 47 included in the ducts 41 and 45. For computing the penetrating quantity of water in the worst-case situation, it is assumed that in the ducts 41 and 45 there is a layer of water. The pressure drop over the return flow in the ducts 41 and 45 will generally be much less than the pressure drop over the airflow in the sub-ducts. On account of their greater length, there permeates more water into each of the five sub-ducts which continue in the duct 41 up to the coupling-through member 43 than in the sub-duct deflecting into the branching duct 45. The compressor capacity for the longer sub-ducts is tuned to this. In a Φ 8/6 mm tubelet with length L=40 m, there permeates 0.001 g of water per hour inwards. To keep the inside of such tubelet below an RH of 70%, an airflow is required of 0.27 l./h. ($7.5 \times 10^{-8}$ m³/s.). The pressure differential required for this is $2.9 \times 10^{-7}$ bar. The sub-duct deflecting into the branching duct 45 has a length of only 10 m, and in the event of such pressure differential a four times greater airflow would occur in this sub-duct, while due to the lesser length four times less is required. The airflow through this deflecting sub-duct could therefore be sixteen times less than the one through the other sub-ducts. A differentiation in the distribution of the airflow through a branched duct system is obtained by making use of different flow resistances in the system. This may be realized, as already indicated above, by a suitable dimensioning of the air through-flow in the coupling-through members. An example of this is the through-flow opening 63 in the sealing plug 62 in the duct end 45a of the branching duct 45 shown in FIG. 8. The pressure determined above of $2.9 \times 10^{-7}$ bar and a total airflow of 2.4 l./h. (i.e., 5×0.27 l./h. for the five continuous sub-ducts, plus 4×0.27 l./h. for the shorter deflecting sub-duct), however, is so low that such flow resistance applied to the duct end 45a in the coupling-through member 46 is not necessary. This pressure and total airflow, too, may be realized with the help of a very simple compressor.

Finally, it should be noted that two or more duct systems of a type as described with reference to the Figures FIG. 3 up to and including FIG. 8 may be simply coupled through, so that it suffices to maintain only one gas flow or airflow through the whole. For this purpose, in a previous duct system a duct end (such as 41b or 45a), instead of with a coupling-through member (of a type such as 43 or 46), is provided with a coupling member (of a type such as 42), and subsequently coupled to the coupling member of a next duct system. The coupling of these two coupling members is effected by a paired connection of the connection pipes 49 and connection pipes 50, i.e., in such a manner that the first chambers 51 of the coupling members are in open connection with one another and the second chambers 52 of the coupling members are in open connection with one another. An advantage of such coupling of duct systems is that only one compressor is required.

What is claimed is:

1. A method for removing moisture from a plurality of cable ducts for guiding and protecting cables, each cable duct of the plurality of cable ducts being provided with a first opening and a second opening, the method comprising the steps of:

providing a coupling-in member for supplying a gas flow to a first number of cable ducts of said plurality of cable ducts by way of the first openings thereof, the coupling-in member being coupled gastight to the first openings of said first number of cable ducts, and being provided with a gastight feed-through opening for each cable included or to be included in at least one of the first number of cable ducts and with a gas-supply opening;

providing a coupling-out member for discharging gas flowing out by way of first openings of said second number of cable ducts, and being provided with a gastight feed-through opening for each cable included in at least one of the second number of cable ducts and with a gas-discharge opening;

providing a coupling-through member for a gastight coupling-through between the second openings of the first number of cable ducts and the second openings of the second number of cable ducts, the coupling-through member being provided with a gastight feed-through opening for each cable included or to be included in at least one of the first and the second number of cable ducts;

continuously supplying a gas to the gas-supply opening of said coupling-in member; and maintaining a continuous flow of the supplied gas through the first number of cable ducts and via the coupling-through member through the second number of cable ducts by maintaining a pressure difference between the gas-supply opening of the coupling-in member and the gas-discharge opening of the coupling-out member.

2. The method of claim 1, wherein the second number of cable ducts is constituted by a single cable duct through which the flow of gas is maintained towards the gas-discharge opening of the coupling-out member.

3. The method of claim 2, further comprising the step of leading the flow of gas over outer walls of the first number of cable ducts, the first number of cable ducts being located within said single cable duct.

4. The method of claim 3, wherein the single cable duct is branched, including a trunk part and a branch provided with a further second opening, into which branch at least one of the first number of cable ducts deflects from the trunk part and extends to the further second opening of the branch of the single cable duct, and wherein the method further comprises the step of providing a further coupling-through member for a gastight coupling through the second opening of said at least one of the first number of cable ducts and the further second opening of the branch, said further coupling through member for a gastight coupling-through being provided with a gastight feed-through opening for each cable included in said at least one of the first number of guiding members.

5. The method of claim 1, further comprising the step of monitoring the humidity of the discharged gas flow.

6. The method of claim 5, further comprising the step of using air as the supplied gas.

7. The method of claim 6, further comprising the step of drying the air prior to using the air as the supplied gas.

8. The method of claim 3, further comprising the step of monitoring the humidity of the discharged gas flow.

9. The method of claim 3, further comprising the step of using air as the supplied gas.

10. The method of claim 9, further comprising the step of drying the air prior to using the air as the supplied gas.

11. A coupling-through member for use in a system for removing moisture from a plurality of cable ducts, the coupling-through member comprising:

a housing including an outer wall, which encloses a first and a second chamber, the first and second chambers located within the housing being mutually gastight and separated from one another by a partition, the outer wall of the housing comprising:

a first connection opening for gastight connecting an end of a first cable duct to the first chamber, and for feeding-through ends of further cable ducts located within the first cable duct by way of feed-through openings in the partition to the second chamber;

further feed-through openings from the second chamber to outside the housing for a gastight feed-through of cables included in one or more of the further cable ducts; and two further connection openings opening out into different chambers, with a first of the two further connection openings being suitable for connecting gas-supply means, and the second of the two further connection openings being suitable for connecting gas-discharge means.

12. A coupling-through member for use in a system for removing moisture from a plurality of cable ducts, the coupling-through member comprising:

a housing including an outer wall which encloses a chamber, the outer wall including:
   a connection opening for gastight connecting an end of a first cable duct to the chamber, and for feeding-through ends of further cable ducts located within the first cable duct into the chamber; and
   feed-through openings from the chamber to outside the housing for a gastight feed-through of cables included in one or more of the further cable ducts.

* * * * *